No. 746,026. PATENTED DEC. 8, 1903.
J. A. CHRIST.
NUT LOCK.
APPLICATION FILED JULY 20, 1903.
NO MODEL.
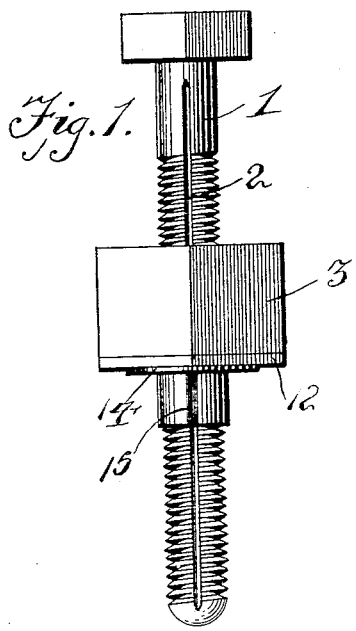
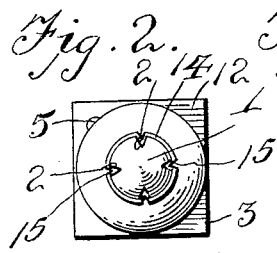
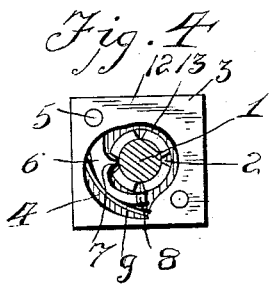
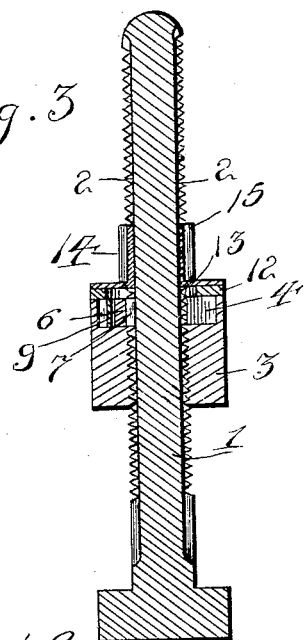
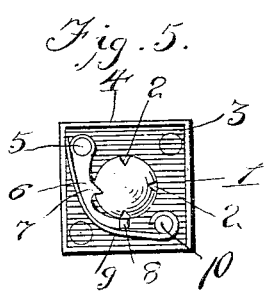
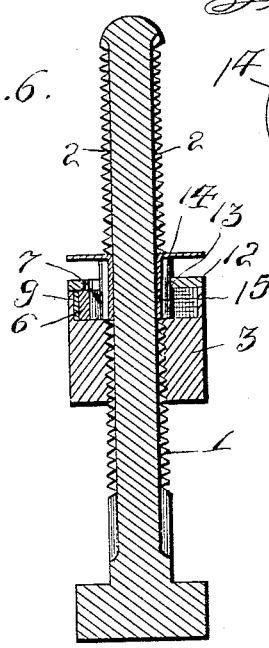
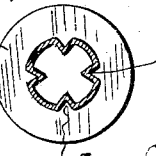
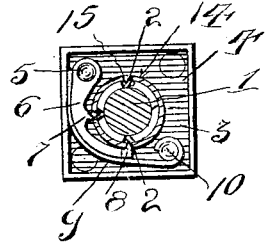
Witnesses
Willis H. Rockwell
J. M. Wilson
Inventor
Josiah A. Christ
By H. R. Wilson
Attorney No. 746,026.                                              Patented December 8, 1903.

UNITED STATES PATENT OFFICE.

JOSIAH A. CHRIST, OF PINEGROVE, PENNSYLVANIA.

NUT-LOCK.

SPECIFICATION forming part of Letters Patent No. 746,026, dated December 8, 1903.

Application filed July 20, 1903. Serial No. 166,329. (No model.)

*To all whom it may concern:*

Be it known that I, JOSIAH A. CHRIST, a citizen of the United States, residing at Pinegrove, in the county of Schuylkill and State of Pennsylvania, have invented certain new and useful Improvements in Nut-Locks; and I do declare the following to be a full, clear, and exact description of the invention, such as will enable others skilled in the art to which it appertains to make and use the same.

This invention relates to improvements in nut-locks.

The object of the invention is to provide a simple and reliable nut-lock wherein means are provided for preventing a retrograde rotation of the nut on a bolt.

Another object is to provide means for disengaging the lock from the bolt to permit the removal of the nut therefrom, also to provide means for excluding snow, dirt, and other foreign matter from the nut.

With these and other objects in view the invention consists of certain novel features of construction, combination, and arrangement of parts, as will be more fully described, and particularly pointed out in the appended claims.

In the accompanying drawings, Figure 1 is a side elevation of a bolt and nut constructed in accordance with the invention. Fig. 2 is an end view of the same. Fig. 3 is a longitudinal sectional view. Fig. 4 is a cross-sectional view through the bolt, showing the end of the nut with the cover-plate of the same in place. Fig. 5 is a similar view with the cover-plate removed. Fig. 6 is a longitudinal sectional view through the bolt and nut, showing the manner of disengaging the locking-pawl from the bolt to permit the removal of the nut. Fig. 7 is a cross-sectional view through the same. Fig. 8 is a cross-sectional view through the sleeve.

Referring more particularly to the drawings, 1 denotes the bolt, in the threaded portion of which is formed a series of longitudinally-disposed grooves 2, which may be of any desired shape, being shown in the present instance as substantially V shape.

3 denotes the nut, here shown as being square, but which may be hexagonal or any desired shape. The outer face or end of the nut is hollow, as shown at 4, and in one corner of said hollow end is fixed a stud 5, on which is pivoted a pawl or dog 6, which is provided with a locking-detent 7, adapted to engage the grooves 2 in the bolt and prevent the nut from becoming unscrewed from the bolt, but permitting the same to be screwed up. The detent 7 is formed on one side with an abrupt square face, which will engage one wall of the groove and prevent the turning of the nut in that direction; but the opposite side of the detent being beveled will permit the same to ride out of the grooves when the nut is turned in this direction, thereby permitting the same to be screwed upon the bolt. The end of the pawl 6 is extended beyond the detent 7, forming a curved arm, on the end of which is formed an outwardly-projecting finger 8. A flat leaf-spring 9 is arranged in the hollow of the nut, one end of the same being connected to a stud 10, fixed in said hollow portion of the nut, said spring being adapted to bear against the pawl 6 and hold the same against the bolt.

12 denotes a cover-plate riveted or otherwise secured to the nut 3 over the hollow portion of the same. In the plate 12 is formed an opening 13, through which the bolt passes, the plate being adapted to hold the pawl and spring in place.

14 denotes a flanged sleeve provided on the inner side of the sleeve portion with a series of ribs or projections 15, which are adapted to enter the grooves 2 in the bolt and hold the cap in place. The flanged sleeve is adapted to serve a double purpose. When in the position shown in Figs. 1, 2, and 3, the same serves as a cap, the flange portion covering the opening 13 in the plate 12 and the ribs on the sleeve portion closing the grooves in the bolt, thereby preventing the entrance of dust, dirt, or snow to the hollow portion of the nut. The sleeve also serves as a key for holding the pawl 6 out of engagement with the grooves to permit the removal of the nut from the bolt, and when used for this purpose the same is slipped on the bolt in a reverse position to that shown in Figs. 1, 2, and 3. The finger 8 of the pawl 6 is now engaged by inserting a pointed instrument of any kind through the opening 13 and pushed out of engagement with the bolt. The key-sleeve is then forced farther along the bolt between the same and the pawl, thereby preventing the same from engaging the bolt and permitting the nut to be turned off the bolt, this arrangement of the sleeve being shown in Figs. 6 and 7.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

1. In a nut-lock, the combination with a longitudinally-grooved bolt, of a nut having a hollow end, a spring-actuated pawl pivotally mounted in said hollow end and adapted to engage the grooves in said bolt, a disengaging finger formed on said pawl, a cover-plate fixed on said nut to hold said pawl in place and having formed therein a bolt-opening, and key retained against endwise movement on said bolt to normally close the opening in said plate and adapted to engage and retract said finger to permit the removal of said nut from said bolt, substantially as described.

2. In a nut-lock, the combination with a longitudinally-grooved bolt, of a nut having a hollow end, a spring-actuated pawl pivotally mounted in said hollow end and adapted to engage the grooves in said bolt, a disengaging finger formed on said pawl, a cover-plate fixed on said nut to hold said pawl in place and having formed therein a bolt-opening, and a key comprising a flanged sleeve retained against endwise movement on said bolt and having interiorly-disposed ribs to enter the grooves in the bolt, said key being adapted to close the opening in said plate or to be reversed upon said bolt and forced between the same and said pawl to hold said pawl out of engagement with said bolt and permit the removal of said nut, substantially as described.

In testimony whereof I have hereunto set my hand in presence of two subscribing witnesses.

JOSIAH A. CHRIST.

Witnesses:
EDW. HUMMEL,
C. A. RITTER.